Nov. 2, 1954   J. P. HOBART   2,693,117
GEAR SHIFT LEVER
Filed Feb. 23, 1952   2 Sheets-Sheet 1
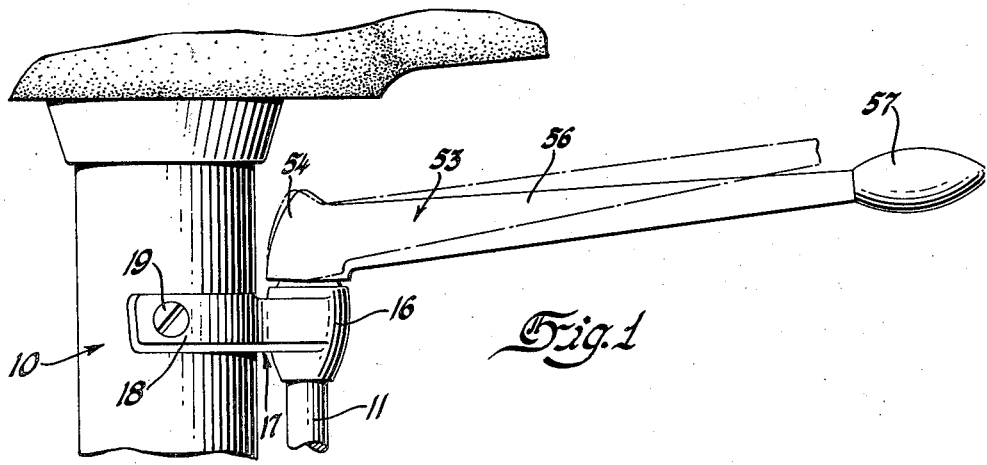
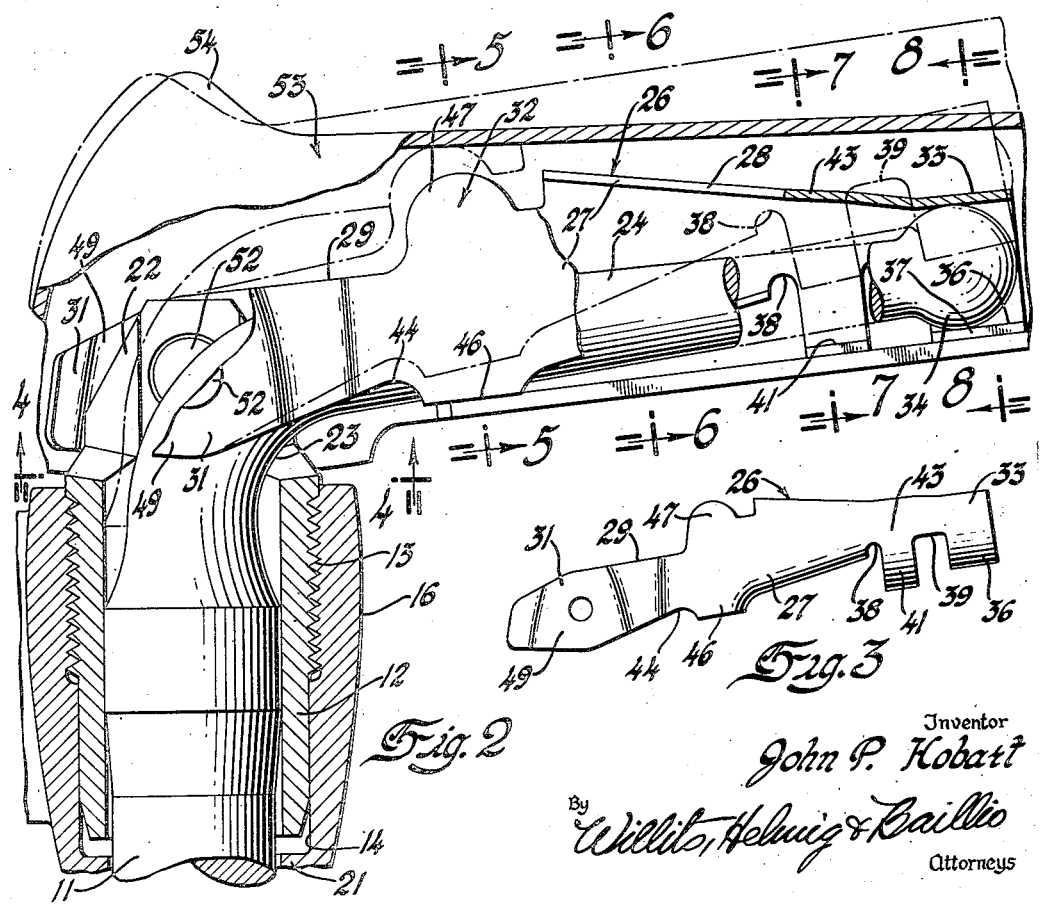
Inventor
John P. Hobart
By Willits, Helmig & Baillio
Attorneys Nov. 2, 1954  J. P. HOBART  2,693,117
GEAR SHIFT LEVER
Filed Feb. 23, 1952  2 Sheets-Sheet 2
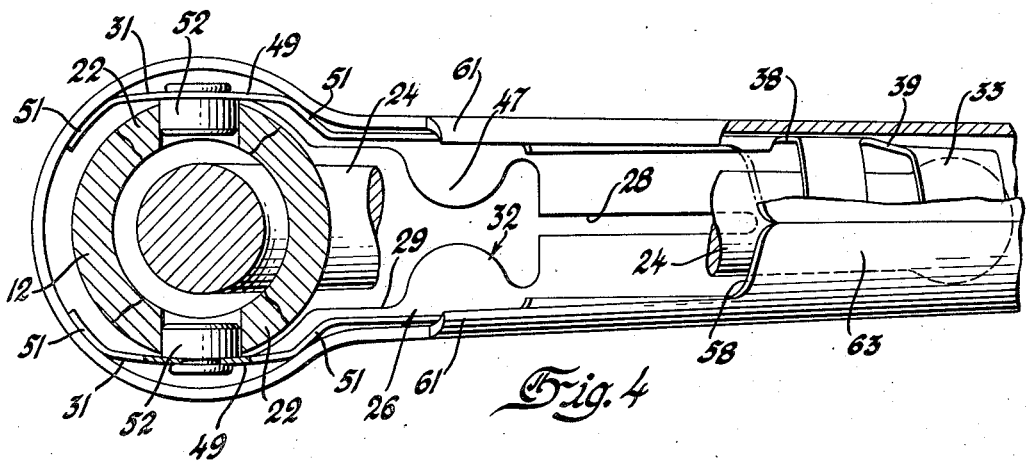
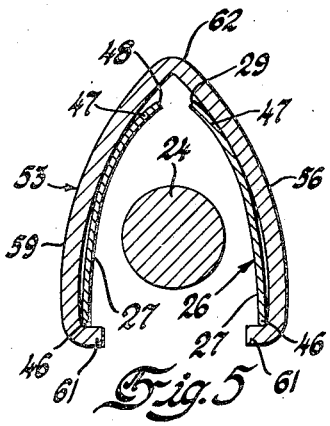
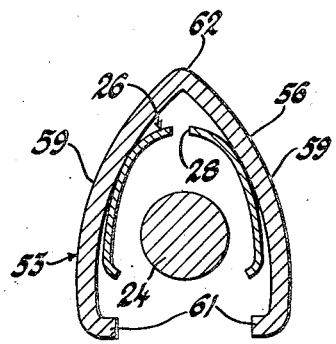
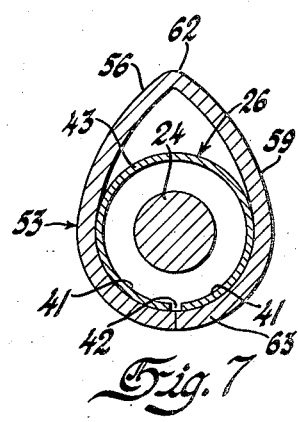
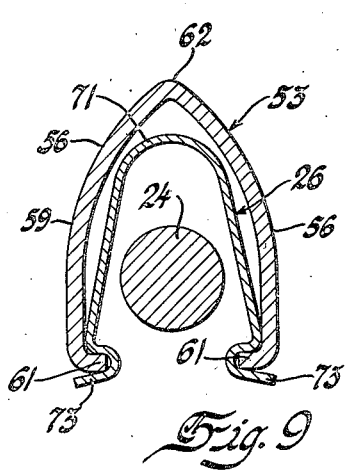
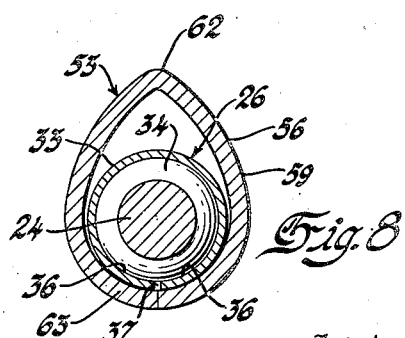
Inventor
John P. Hobart
By Willits, Helmig & Baillio
Attorneys

United States Patent Office 2,693,117
Patented Nov. 2, 1954

2,693,117

GEAR SHIFT LEVER

John P. Hobart, Clarence, N. Y., assignor to General Motors Corporation, Detroit, Mich., a corporation of Delaware Application February 23, 1952, Serial No. 273,120

6 Claims. (Cl. 74—484)

This invention relates to improvements in gear shift levers for motor vehicles and has particular relation to a spring fastener by which a gear shift lever may be secured in operative relation to the radially disposed arm by which the gear shift rod for operating the transmission of the vehicle is operated.

It has been the custom heretofore to secure gear shift levers in operative position by the use of pins adapted to project through the fulcrum end of a lever and into openings extending transversely through the sleeve bearing in which the shift rod is mounted. These pins have been difficult to insert in the openings in a shift lever and a sleeve, they have been difficult to retain in these openings and the ends of the pins are visible on the exterior surface of a shift lever. It has also been customary to employ various kinds of anti-rattle springs to hold a shift lever in engagement with the end of the arm by which a shift rod is moved into different positions for operating the transmission of the motor vehicle. These springs and pins make shift levers expensive and difficult to assemble and are not entirely satisfactory in operation.

It is now proposed to provide a one-piece fastener by which a shift lever may be held in position upon the arm for operating the shift rod for the transmission of a motor vehicle. This fastener takes the place of anti-rattle springs previously employed, carries the pins for pivotally securing the shift lever to the bearing sleeve for the shift rod, makes easier the assembly of the various parts of the mechanism, reduces the number of parts required and leaves the visible exterior surface of the shift lever free of openings and pins.

In the drawings:

Figure 1 is a fragmentary view of the steering column of the motor vehicle having secured thereto a shift rod for operating a motor vehicle transmission. The shift rod has a shift lever by which the rod is operated which is constructed and assembled according to the principles of the invention.

Figure 2 is an enlarged fragmentary view having parts thereof broken away and shown in cross-section and illustrating the shift lever and the means by which the shift lever is mounted upon the laterally disposed arm of the shift rod. Figure 2 also illustrates the sleeve bearing in which the shift rod is mounted for rotational and axial movement and on which the shift lever is mounted for pivotal and rotational movement.

Figure 3 is a side elevational view of the spring fastener part of the structure disclosed by Figure 2.

Figure 4 is a cross-sectional view of the shift lever structure taken substantially in the plane of line 4—4 on Figure 2 looking in the direction of the arrows thereon. Figure 4 has various parts of the structure broken away to better illustrate the interior construction of certain parts of the structure.

Figures 5, 6, 7 and 8 are transverse sectional views through the shift lever structure taken substantially in the planes of lines 5—5, 6—6, 7—7, and 8—8 of Figure 2, looking in the direction of the arrows on these lines.

Figure 9 is a view of a modified form of shift lever and spring fastener structure as the modified structure might appear in a plane corresponding to the plane of line 5—5 on Figure 2 and looking in the direction of the arrows on line 5—5.

In Figure 1, the steering column of the motor vehicle is indicated by the numeral 10. Extending upwardly in parallel relation to the steering column 10 is a shift rod 11 by which the transmission of the motor vehicle is operated. The shift rod 11 may be employed to operate the transmission in any desired manner as by limited rotational and axial movement in opposite directions. The shift rod 11 is supported in a bearing sleeve 12 which is fitted at 13 within the upper part of an opening 14 extending throughout the greater portion of a boss 16. The boss 16 forms a part of a bracket 17 having arcuate ends 18 which are secured by screws 19 to the steering column 10. The lower end of the boss 16 is flanged inwardly at 21 to shield the lower end of the bearing sleeve 12. The threads 13 form a loose fit between the sleeve 12 and the boss 16 to permit the sleeve 12 to be easily rotated throughout the limited rotational movement involved in operating the shift rod 11. The upper end of the sleeve 12 extends above the boss 16 and is transversely slotted in such a way as to provide a pair of spaced supports indicated at 22 and between which the shift rod 11 is bent laterally at 23 to provide a rigid shift rod operating arm indicated at 24.

The arm 24 is received within and partially enclosed by a spring fastener indicated generally at 26. The spring fastener 26 is elongated in formation and is bent along the middle to provide oppositely disposed pairs of relatively parallel sides indicated at 27. The bent middle part of the fastener 26 is also slotted intermediate the ends thereof at 28 and cut away at 29 between one end of the slot 28 and the adjacent end of the structure. The cutaway part 29 provides a pair of parallel ends, bars or supports 31 at one end of the fastener 26 and an oppositely disposed pair of clamping and locking surfaces 32 between the supports 31 and the part of the fastener adjacent the slot 28.

The end of the fastener 26 beyond the slot 28 is formed in such a way as to provide means for pivotally securing the end of the fastener to the end of the arm 24. Such means may be formed in any desired manner as by providing a socket 33 for receiving a spherical end or ball 34 formed on the extreme outer end of the arm 24. The socket 33 may be provided with any suitable anti-rattle means to resiliently secure the ball 34 within the socket 33. Such anti-rattle means sometimes is constructed to provide irregularly formed springs which occupy an annular space between the ball and the socket. However, the anti-rattle means may be constructed as shown particularly in Figures 2 and 8. Such form of anti-rattle means comprises forming the socket 33 as an expansible spring having relatively movable and oppositely disposed spring ends 36 separated by a slot 37. The socket 33 is made slightly smaller than the ball 34 so that the slot 37 is closed when the ball 34 is not within the socket 33. However, when the ball 34 is inserted within the socket 33 the socket expands and opens the slot 37. The socket 33 therefore will resiliently engage the ball 34 throughout substantially a 360° line of contact between the ball 34 and the socket 33.

The edges of the fastener 26 are notched at 38 and 39 to provide between the notches, spring ends 41 having a gap 42 therebetween. The spring ends 41 and the supporting part of the fastener structure provide a compressible securing ring indicated at 43, which is partially separated from the socket 33 by the notches 39. When the fastener 26 is formed, the spring ends 41 are formed on a relatively large radius of curvature so that the gap 42 between the spring ends is a relatively large gap. However, the spring ends 41 can be deflected inwardly into the position in which they are shown in Figure 7 and in which only a minimum gap 42 is formed between the spring ends, without appreciably affecting the resilient force with which the socket 33 is adapted to engage the ball 34. The edges of the fastener 26 are further notched at 44 to provide between the notches 44 and 38 the latching edges indicated at 46. Opposite the latching edges 46 the fastener 26 is formed to provide resilient fingers 47, which are formed adjacent the end of the slot 28 by decreasing the cutout portions indicated at 29. The fingers 47 are spaced from one another by the slot indicated at 48.

The parallel supports 31 extend from the latching edges 46 and the fingers 47 to the opposite end of the fastener 26. The spring ends 31 are flattened at 49 and curved at 51 at the opposite end of the flattened portions 49.

The curvature of the portions 51 is substantially concentric with respect to the axis of the shift rod 11. Secured in openings in the central part of the flattened portions 49 are inwardly projecting pins 52, the axes of which when in operative positions are aligned with respect to one another and intersect the axis of the shift rod 11.

The lever for operating the gear shift mechanism is made in the form of a cover 53 having an enlarged cone shaped end 54 and an elongated tapering part 56 on which a knob 57 is secured at the outer end. The enlarged end 54 is open at the bottom and has walls which taper away from the opening in substantially concentric relation to the axis of the shift rod 11. The part 56 is cut away adjacent the end 54 to provide an elongated opening 58 which provides a continuation of the opening in the lower part of the enlarged end 54. The side walls 59 of the part 56 are formed in such a way as to provide parallel flanges 61 on opposite sides of the cutaway part or opening 58. Also, the side walls 59 are curved inwardly from the lower edges thereof toward a common elongated upper edge indicated at 62. Beyond the opening 58 the lever 53 is closed at the bottom to provide a socket 63 which continues to the end of the lever and within the knob 57.

Figures 5, 6, 7 and 8 show the shape of the side walls 59 and the socket 63 at the various places indicated by the section lines on Figure 2.

It is apparent that the shift lever mechanism consists only of two parts, the spring fastener 26 and the lever 53. To assemble the mechanism, the fastener 26 is first assembled upon the arm 24 by inserting the ball 34 into the socket 33 and by pivoting the fastener downwardly over the outer surface of the supports 22 formed at the upper end of the sleeve 12. The parallel supports 31 are formed in such a way that it is necessary to spring these supports outwardly in order to insert the pins 52 in the openings in the supports 22. When the pins 52 are once received within the support 22 openings, the resiliency of the supports 31 will retain the pins within the openings.

The cover 53 is next assembled upon the fastener 26 and the arm 24 in similar manner. The socket end 33 of the fastener 26 is inserted into the socket 63 through the opening 58 and then the cover 53 is pivoted downwardly upon the fastener 26 to compress the side walls 27 of the fastener 26 until the latching edges 46 spring outwardly within the flanges 61. It will be apparent from Figure 8 that the socket 33 is somewhat smaller than the cross-sectional area of the cover 53 at this location. The cover 53 therefore does not support the fastener 26 in the vicinity of the socket 33 but leaves the socket free to expand and contract upon the ball 34 to prevent rattling between the fastener 26 and the arm 24. However, adjacent the socket 33 is the compression ring part 43 of the fastener which is provided with the spring ends 41. The fastener is made in such a way that the spring ends 41 must be bent inwardly to insert the ring 43 within the socket 63 and this inward bending of the spring ends 41 puts the entire ring 43 in compression within the socket 63. It will be apparent from Figure 7 that the ring 43 resiliently supports one end of the fastener 26 within the cover 53 and resiliently opposes movement of this end of the fastener in any direction within the socket 63. Another region where the fastener 26 is resiliently supported within the cover 53 is at this locking and clamping surface 32 and between the fingers 47 and the latching edges 46. The fastener 26 is made in such a way that both the latching edges 46 and the fingers 47 must be deflected inwardly to a considerable extent in order to position the cover 53 upon the fastener 26. When the latching edges 46 spring outwardly within the flanges 61, it will be apparent from Figure 5 that the entire fastener in this region will be in compression within the cover 53 to prevent movement between the fastener and the cover in opposite directions. The movement of the enlarged end 54 of the cover over the parallel ends or supports 31 also deflects the parts 51 of the supports 31 inwardly in such a way as to slightly bend the flattened parts 49, thereby firmly securing the pins 52 within the openings in the supports 22.

The fastener 26 and the cover 53 both can be easily and quickly assembled upon the arm 24 merely by successively giving each part a lateral movement and a pivotal movement and by applying the force required finally to snap the parts into position.

Figure 9 illustrates another form in which the fastener 26 may be made, particularly the part of the fastener in the region of line 5—5 on Figure 2. In the structure shown by Figure 9, the slot 28 is entirely eliminated and the cutout portion 29 is terminated outwardly beyond the position in which the fingers 47 are formed. This permits the formation of a bend 71 which extends lengthwise throughout the middle of the fastener from this location to the socket end of the fastener. The fastener also is formed in this region in such manner that the cover 53 when assembled upon the fastener, does not touch the fastener adjacent the bend 71. The fastener is held in position in this region within the cover 53 by latching hooks 73 which are formed to extend around the flanges 61, thereby preventing either inward or outward movement of the fastener with respect to the cover.

I claim:

1. A gear shift mechanism comprising an elongated transversely curved spring fastener having a pair of parallel and laterally movable ends and being adapted to receive therein and between said ends a gear shift arm having rotational and axial movement and the end of a bearing sleeve in which the gear shift rod operated by said arm is supported, an axially aligned pair of pins projecting inwardly from said parallel ends of said fastener and being adapted to extend within openings formed in said sleeve, anti-rattle means at the end of said fastener opposite said pins for resiliently supporting the outer extremity of said shift arm, and a cover for said fastener and said arm, said cover being formed to provide a socket at one end for receiving and contracting said fastener at the end thereof adjacent said anti-rattle means and having a slot formed along one side thereof between said socket and the opposite end of said cover for receiving said fastener, said shift arm and the end of said sleeve, said fastener and said cover being formed to contract said fastener to resiliently retain said pins in said openings and being provided adjacent said pins with locking means resiliently securing said cover upon said fastener when said mechanism is assembled by pivotal movement of said cover about said fastener.

2. A gear shift mechanism comprising an elongated spring fastener which is curved transversely along a portion of the length thereof and which is provided at the inner end thereof with a pair of parallel supports and at the opposite end thereof with resilient anti-rattle means, said fastener being adapted to be projected over the laterally projecting end of a rotatably and axially movable shift rod to engage said shift rod end and said anti-rattle means and with said said parallel supports being disposed on opposite sides of said shift rod and the end of a rotatable bearing sleeve for said shift rod, a cover for said fastener and said shift rod end, said cover being formed to provide a slot adjacent one end thereof and a socket adjacent the opposite end thereof, said socket being adapted to receive and to transversely contract said fastener at the end thereof adjacent said anti-rattle means and on pivotal movement of said cover about said socket to transversely contract other parts of said fastener, said supports and the end of said sleeve being formed to provide transversely disposed bearing means for pivotally supporting said cover and said fastener, said bearing means being resiliently held in operative position in response to the pivotal movement of said cover about said socket end of said cover, said cover and said fastener adjacent said bearing means being formed to provide resilient latch means resiliently retained in closed position by the final pivotal movement of said cover upon said fastener about the socket end of said cover.

3. A gear shift lever adapted to be used with a rotatably and axially movable gear shift rod having a rigid laterally projecting arm for operating the rod and having a sleeve bearing for the rod adjacent the arm for rotational movement with said arm for pivotally supporting said lever, and comprising an elongated spring fastener having a curved middle portion extending lengthwise thereof and providing at one end thereof an expansible and contractible socket for receiving the end of said arm, said fastener being split adjacent the opposite end thereof to provide a parallel pair of spring bars, a pivotal bearing means associated with said spring bars and said bearing sleeve for pivotally mounting said fastener upon said bearing sleeve, said pivotal bearing means being formed to release said fastener from said bearing sleeve upon opening movement of said spring bars and to secure said fastener in operative relation to said bearing sleeve upon closing movement of said spring bars, an elongated cover for said arm and said fastener and having a socket formed intermediate the ends thereof for receiving the socket end of said fastener and the end of said arm, said socket in said cover being formed to contract said socket in said fastener when said fastener is inserted into said cover by longitudinal movement of said fastener and said cover in opposite directions, said cover being formed to provide a slot between the socket in said cover and one end of said cover for receiving said fastener and said arm within one side of said cover, thereby permitting movement of said cover over the arm end of said fastener by pivotal movement of said cover upon the socket end of said fastener, said cover and said fastener being also formed with converging surfaces intermediate the opposite ends of said fastener for engagement with one another for compressing said fastener intermediate the ends thereof when said cover is moved pivotally upon the socket end of said fastener for enclosing said fastener and said arm within said cover, said cover and said fastener being provided adjacent the opposite edges thereof and intermediate the ends of said fastener with interlocking latch means for resiliently latching said fastener within said cover upon the final closing pivotal movement of said cover upon said fastener.

4. A gear shift lever adapted to be used with a rotatably and axially movable gear shift rod having a rigid laterally projecting arm for operating the rod and having a sleeve bearing for the rod adjacent the arm for rotational movement with said arm and for pivotally supporting said lever, and comprising a lever in the form of a cover for said arm, a spring fastener within said cover and over said arm for securing said cover upon said arm and said sleeve, said spring fastener having means at one end providing a pivotal connection between an intermediate part of said cover and the end of said arm and at the opposite end having means pivotally connecting the end of said cover to said sleeve.

5. A gear shift lever adapted to be used with a rotatably and axially movable gear shift rod having a rigid laterally projecting arm for operating the rod and having a sleeve bearing for the rod adjacent the arm for rotational movement with said arm and for pivotally supporting said lever, and comprising a lever in the form of a cover for said arm, a spring fastener within said cover and over said arm for securing said cover upon said arm and said sleeve, said spring fastener having means at one end providing a pivotal connection between an intermediate part of said cover and the end of said arm and at the opposite end having means pivotally connecting the end of said cover to said sleeve, said spring fastener and said cover being formed to contract said spring fastener upon the movement of said cover upon said spring fastener and said spring fastener and said cover being formed at one edge to provide latch means for resiliently securing said spring fastener within said cover.

6. The spring fastener for securing the cover to the gear shift arm of a transmission shift rod and comprising an elongated transversely curved spring having a pair of parallel and laterally movable ends and being adapted to receive therein and between said ends a gear shift arm having the rotational and axial movement of said gear shift rod and the end of a bearing sleeve in which said gear shift rod is operated by said gear shift arm, axially aligned pin means projecting inwardly from said parallel ends of said spring and being adapted to extend within openings formed in said bearing sleeve, anti-rattle means at the end of said spring opposite said pin means for resiliently supporting the outer extremity of said shift arm, said spring and said arm being adapted to be projected into a socket formed at one end of a cover for receiving and contracting said spring at the end thereof adjacent said anti-rattle means, said shift arm and said spring and the end of said sleeve being adapted to be projected through a slot formed on one side of said cover, said spring being formed to contract within said cover to resiliently retain said pin means in said openings, said spring being provided with locking means adjacent said pin means for resiliently engaging and locking said spring within said cover when said cover is assembled on said spring by pivotal movement of said cover about said spring.

References Cited in the file of this patent

UNITED STATES PATENTS

| Number | Name | Date |
|---|---|---|
| 2,275,779 | MacPherson | Mar. 10, 1942 |
| 2,286,773 | Wahlberg | June 16, 1942 |
| 2,334,421 | Leach | Nov. 16, 1943 |
| 2,546,440 | Grinham et al. | Mar. 27, 1951 |